US011061665B2

(12) United States Patent
Yang

(10) Patent No.: US 11,061,665 B2
(45) Date of Patent: Jul. 13, 2021

(54) SYSTEM FOR ONLINE CASCADED LOADING FIRMWARE BASED ON BOUNDARY SCAN AND METHOD THEREOF

(71) Applicants: Inventec (Pudong) Technology Corporation, Shanghai (CN); Inventec Corporation, Taipei (TW)

(72) Inventor: Ming Yang, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 95 days.

(21) Appl. No.: 16/575,839

(22) Filed: Sep. 19, 2019

(65) Prior Publication Data
US 2021/0072979 A1    Mar. 11, 2021

(30) Foreign Application Priority Data
Sep. 9, 2019   (CN) .......................... 201910848723.X

(51) Int. Cl.
G06F 8/71    (2018.01)
G06F 8/656   (2018.01)
G06F 13/372  (2006.01)
G06F 21/57   (2013.01)

(52) U.S. Cl.
CPC .............. *G06F 8/71* (2013.01); *G06F 8/656* (2018.02); *G06F 13/372* (2013.01); *G06F 21/572* (2013.01)

(58) Field of Classification Search
CPC ........ G06F 8/656; G06F 8/71; G06F 13/372; G06F 21/572
USPC ......................................................... 717/170
See application file for complete search history.

(56) References Cited

U.S. PATENT DOCUMENTS

| 7,772,881 B1* | 8/2010 | Yap et al. ............... G06F 8/656 326/41 |
| 9,165,143 B1* | 10/2015 | Sanders et al. ....... G06F 21/572 |
| 2015/0309921 A1* | 10/2015 | Smith et al. .............. G06F 8/70 717/131 |
| 2017/0090909 A1* | 3/2017 | Guo et al. .............. G06F 21/572 |
| 2019/0354684 A1* | 11/2019 | Black et al. ............... G06F 8/63 |

* cited by examiner

*Primary Examiner* — Qing Chen
*Assistant Examiner* — Mohammed N Huda
(74) *Attorney, Agent, or Firm* — David R. Stevens; Stevens Law Group

(57) ABSTRACT

When a host computer determines that a firmware version to be loaded is higher than a firmware version of each chip to be loaded, the host computer sends a loading flag to the chips to be loaded to enable the chips to be loaded enters a loading mode. The host computer redefines multiple controllable physical connections between each chip to be loaded entering the loading mode and a master controller chip connected thereto so that they act as loading buses. Each chip to be loaded executes a loading process according to a frame period and a frame count to receive the load file completely and then executes the IAP command to program its ROM. When each chip to be loaded finishes the loading process, each chip to be loaded jumps out of the load mode, and the host computer restores the definitions of the plurality of controllable physical connections.

10 Claims, 4 Drawing Sheets

```
┌─────────────────────────────────────────────────────────────┐
│ providing a host computer, a TAP controller, and N printed │
│ circuit boards, wherein each printed circuit board is       │
│ provided with one or more master controller chips cascaded  │  210
│ through the JTAG interface and one or more chips to be      │
│ loaded, each chip to be loaded is connected to one of the   │
│ master controller chips through a plurality of controllable │
│ physical connections, the host computer is connected to the │
│ TAP controller, the printed circuit boards are serially     │
│ connected to each other, the TAP controller is connected to │
│ the first printed circuit board and the Nth printed circuit │
│ board through the JTAG interfaces, and N is greater than or │
│ equal to two and is a positive integer                      │
└─────────────────────────────────────────────────────────────┘
                              │
                              ▼
┌─────────────────────────────────────────────────────────────┐
│ verifying whether a load file is valid and whether a JTAG   │  220
│ link of each printed circuit board is available by the host │
│ computer                                                    │
└─────────────────────────────────────────────────────────────┘
                              │
                              ▼
┌─────────────────────────────────────────────────────────────┐
│ when verifying that the load file is valid and the JTAG     │
│ link of each printed circuit board is available by the host │
│ computer, collecting the information of the firmware        │  230
│ version of each chip to be loaded through the controllable  │
│ physical connections by the host computer, and comparing    │
│ the firmware version of each chip to be loaded with the     │
│ firmware version to be loaded respectively by the host      │
│ computer                                                    │
└─────────────────────────────────────────────────────────────┘
```

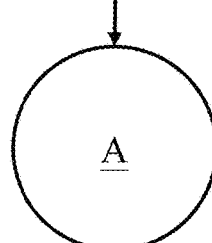

FIG. 3A

SYSTEM FOR ONLINE CASCADED LOADING FIRMWARE BASED ON BOUNDARY SCAN AND METHOD THEREOF

CROSS-REFERENCE TO RELATED APPLICATION

This application claims the benefit of Chinese Patent Application No. 201910848723.X, filed Sep. 9, 2019.

BACKGROUND OF THE INVENTION

Field of the Invention

The present invention relates to a system for online cascaded loading firmware and a method thereof, more particularly to a system for online cascaded loading firmware based on boundary scan and a method thereof.

Description of the Related Art

At present, there are two methods applied on the printed circuit board assembly (PCBA) production line to online load firmware to the products and the test fixtures mounted thereon, namely the Joint Test Action Group (JTAG) mode and the In Application Programming (IAP) mode.

To load the firmware in the JTAG mode, the target chip must have a standard JTAG interface, which includes four physical lines, namely a test clock (TCK) line, a test mode select (TMS) line, a test data input (TDI) line, and a test data output (TDO) line. Only chips with the standard JTAG interface can be cascaded into a closed link. However, the loading interface of the chip to be loaded provided by some manufacturers adopts the serial wire debug (SWD) standard, which only includes two physical lines, namely a SWD data input/output (SWDIO) line and, a serial wire clock (SWCLK) line. It is difficult to directly interface with other standard JTAG interface chips for the chip to be loaded whose loading interface adopting the SWD standard. In addition, the SWD standard does not yet support point-to-multipoint transmission, so the chips to be loaded, whose loading interface adopting the SWD standard, cannot be cascaded for online loading firmware. Therefore, loading the firmware in the JTAG mode is limited by the loading interface of the chip to be loaded specified by the chip manufacturer.

When the firmware can be loaded to the chip to be loaded in the IAP mode, the user can customize the loading interface of the chip to be loaded by using a host computer and the participation of the additional master controller chip is required in the custom process. For example, the loading interface of the chip to be loaded is customized as a parallel interface or a serial interface, or the loading interface of the chip to be loaded is customized as a serial peripheral interface (SPI) bus or an inter-integrated circuit ($I^2C$) bus. However, when the firmware can be loaded in the IAP mode, the development of the software of the driver layer and the application layer of the master controller chip is required in addition to the development of the software of the chip to be loaded and the host computer, to support the data transfer of the load function, thereby the development cost being higher. In addition, when the firmware is loaded in a cascade manner, the host computer, each master controller chip, and each chip to be loaded need to communicate with each other. The process is more complicated than the communication method with the JTAG standard, and the partial loading rate is inevitably sacrificed.

In summary, how to combine the advantages of the JTAG mode and the IAP mode to achieve highly efficient loading of firmware without changing the hardware resources of existing printed circuit boards as much as possible, has been one of the important research and development topics of relevant industry.

SUMMARY OF THE INVENTION

The present invention provides a system for online cascaded loading firmware based on boundary scan and a method thereof.

According to an embodiment, the present invention provides a system for online cascaded loading firmware based on boundary scan. The system includes a host computer, a TAP controller, and N printed circuit boards. Each printed circuit board is provided with one or more master controller chips cascaded through a JTAG interface and one or more chips to be loaded. Each chip to be loaded is connected to one of the master controller chips through a plurality of controllable physical connections. The printed circuit boards are serially connected to each other, and the TAP controller is connected to the first printed circuit board and the Nth printed circuit board through the JTAG interfaces, and N being greater than or equal to two and being a positive integer. The host computer, connected to the TAP controller, is configured to verify whether a load file is valid and whether a JTAG link of each printed circuit board is available. When the host computer verifies that the load file is valid and the JTAG link of each printed circuit board is available, the host computer collects the information of a firmware version of each chip to be loaded through the controllable physical connections, and compares the firmware version of each chip to be loaded with a firmware version to be loaded. When the host computer determines that the firmware version to be loaded is higher than the firmware version of at least one the chip to be loaded, the host computer sends a loading flag to the at least one the chip to be loaded, so that the at least one the chip to be loaded enters a loading mode. The host computer redefines the controllable physical connections between the at least one the chip to be loaded entering the loading mode and the master controller chip connected thereto, so that the controllable physical connections are used as the loading buses and have the same data flow direction to wait to receive the load file. The host computer sends the load file and an IAP command to the at least one the chip to be loaded, so that the at least one the chip to be loaded executes a loading program according to a frame period and a frame count to completely receive the load file, and executes the TAP command to program the Read-Only Memory (ROM) it has. When the host computer finishes executing the loading program by the at least one the chip to be loaded, the at least one the chip to be loaded jumps out of the loading mode, and the host computer restores the definitions of the controllable physical connections between the at least one the chip to be loaded and the master controller chip connected thereto.

According to an embodiment, the present invention provides a method for a method for online cascaded loading firmware based on boundary scan. The method includes following steps of: providing a host computer, a TAP controller, and N printed circuit boards, wherein each printed circuit board is provided with one or more master controller chips cascaded through the JTAG interface and one or more chips to be loaded, each chip to be loaded is connected to one of the master controller chips through a plurality of controllable physical connections, the host computer is connected to the TAP controller, the printed circuit boards are serially connected to each other, the TAP controller is connected to the first printed circuit board and the Nth printed circuit board through the JTAG interfaces, and N is greater than or equal to two and is a positive integer; verifying whether a load file is valid and whether a JTAG link of each printed circuit board is available by the host computer; when verifying that the load file is valid and the JTAG link of each printed circuit board is available by the host computer, collecting information of a firmware version of each chip to be loaded through the controllable physical connections by the host computer, and comparing the firmware version of each chip to be loaded with a firmware version to be loaded respectively by the host computer; when determining that the firmware version to be loaded is higher than the firmware version of at least one the chip to be loaded by the host computer, sending a loading flag to the at least one the chip to be loaded by the host computer, so that the at least one the chip to be loaded entering a loading mode; redefining the controllable physical connections between the at least one the chip to be loaded entering the loading mode and the master controller chip connected thereto by the host computer, so that the controllable physical connections being used as the loading buses and having the same data flow direction to wait to receive the load file; sending the load file and an IAP command to the at least one the chip to be loaded by the host computer, so that the at least one the chip to be loaded executing a loading program according to a frame period and a frame count to completely receive the load file, and executing the IAP command to program the ROM it has; and when finishing executing the loading program by the at least one the chip to be loaded, the at least one the chip to be loaded jumping out of the loading mode, and the host computer restoring the definitions of the controllable physical connections between the at least one the chip to be loaded and the master controller chip connected thereto.

According to above-mentioned contents, the difference between the present invention and the conventional technology is that when the host computer determines that the firmware version to be loaded is higher than the firmware version of at least one chip to be loaded, the loading flag is sent to the at least one chip to be loaded to enable the at least one chip to be loaded to enter a loading mode; the host computer redefines a plurality of controllable physical connections between the at least one chip to be loaded entering the loading mode and the master controller chip connected thereto so that they act as loading buses; the host computer sends a load file and an IAP command to the at least one chip to be loaded through the loading buses, and the at least one chip to be loaded executes a loading program according to a frame period and a frame count to completely receive the load file and then executes the IAP command to program its read-only memory; when the at least one chip to be loaded finishes the loading process, the at least chip to be loaded jumps out of the loading mode, and the host computer restores the definitions of the controllable physical connections.

By using above technical means, the present invention can fully utilize existing hardware resources, construct a flexible parallel loading bus, and improve data transmission without developing an independent loading bus. The chip is suitable for online cascaded loading firmware on the production line without the limitation of its own JTAG standard interface. The present invention does not require the development of related functions of the master controller chip on the printed circuit board, and saves the development cost and the process cost. Since the loading bus is not sensitive to the periodicity of data transmission, it is not affected by the operating system of the host computer, and has better adaptability for application.

BRIEF DESCRIPTION OF THE DRAWINGS

The structure, operating principle and effects of the present invention will be described in detail by way of various embodiments which are illustrated in the accompanying drawings.

FIG. 3A and FIG. 3B are a flow chart of a method for online cascaded loading firmware based on boundary scan executed by the system for online cascaded loading firmware based on boundary scan of FIG. 1.

DETAILED DESCRIPTION OF THE PREFERRED EMBODIMENTS

Figure 1:
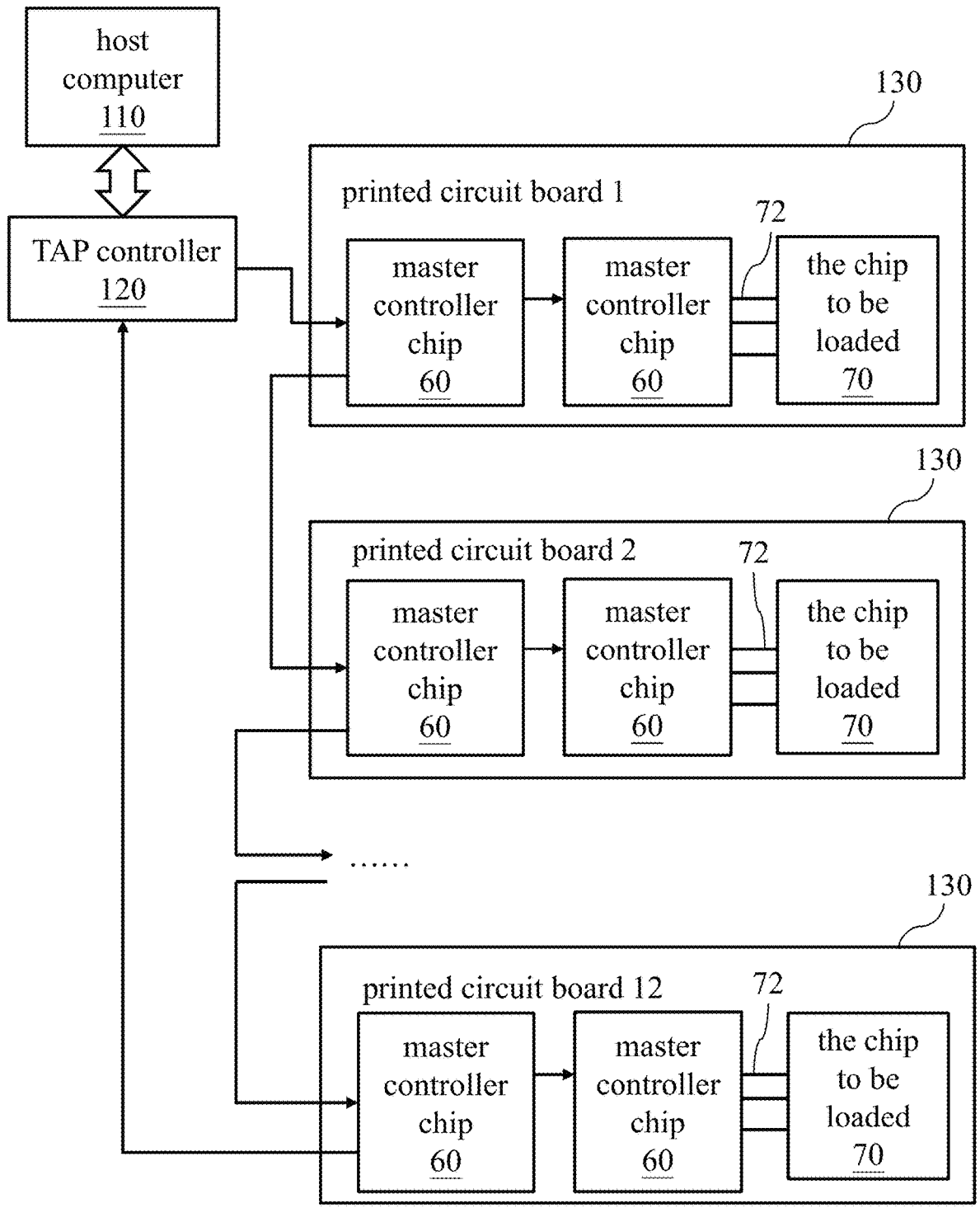
FIG. 1 is a schematic structural diagram of an embodiment of a system for online cascaded loading firmware based on boundary scan according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention. As used herein, the term "or" includes any and all combinations of one or more of the associated listed items.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

A system for online cascaded loading firmware based on boundary scan and a thereof according to the present invention are illustrated in following paragraphs. Please refer to FIG. 1, which is a schematic structural diagram of an embodiment of a system far online cascaded loading firmware based on boundary scan according to the present invention. The system for online cascaded loading firmware based on boundary scan 100 can comprise a host computer 110, a test access port (TAP) controller 120, and N printed circuit boards 130. Each printed circuit board 130 is provided with two master controller chips 60 cascaded through the JTAG interface and a chip to be loaded 70. Each chip to be loaded 70 is connected to a master controller chip 60 through a plurality of controllable physical connections 72. The host computer 110 is connected to the TAP controller 120. The printed circuit boards 130 are serially connected to each other. The TAP controller 120 is connected to the first printed circuit board 130 (i.e., the uppermost printed circuit board 130 in the FIG. 1, indicated by printed circuit board 1) and the Nth printed circuit board 130 (i.e., the lowermost printed circuit board 130 in the FIG. 1, indicated by printed circuit board 12, in this embodiment, N is 12) through the JTAG interfaces. N is greater than or equal to two and is a positive integer.

The chip to be loaded 70 may be a microcontroller chip (MCU), a logic chip, such as a complex programmable logic device (CPLD) and a field programmable gate array (FPGA), a semi-custom chip that work by burning firmware, or a system on a chip (SoC).

It should be noted that when each printed circuit board is provided with a plurality of master controller chips cascaded through the JTAG interface and a plurality of chips to be loaded, the master controller chips may be connected in series with each other, each chip to be loaded may be connected to different master controller chips or the same master controller chip, and the quantities of the controllable physical connections between each chip to be loaded and the master controller chip 60 connected thereto are not necessarily the same and can be adjusted according to actual needs.

In this embodiment, the system for online cascaded loading firmware based on boundary scan 100 can be applied for loading the firmware to the virtual dual in-line memory module (DIMM) fixture in the boundary scan test for the server motherboard board. That is, the printed circuit board 130 is a virtual DIMM fixture, N is 12, and each virtual DIMM fixture has two JTAG links cascaded. However, this embodiment is not intended to limit the present invention, and may be adjusted according to actual needs.

Each controllable physical connection 72 may be a local bus (L-Bus), an SPI bus, a $I^2C$ bus, or a general purpose input/output (GPIO) pin. In this embodiment, the controllable physical connections 72 between each chip to be loaded 70 and the master controller chip 60 connected thereto may comprise twenty L-Buses, four SPI buses, two $I^2C$ bus, and one GPIO pin. There are twenty-seven physical lines (i.e., twenty-seven controllable physical connections 72) between each chip to be loaded 70 and the master controller chip 60 connected thereto. However, this embodiment is not intended to limit the present invention, and may be adjusted according to actual needs. It should be noted that in order to avoid over-complicating the drawing, only three lines are drawn for representing the controllable physical connections 72 between each chip to be loaded 70 and the master controller chip 60 connected thereto.

The host computer 110 can first verify whether the load file is valid and whether the JTAG links of each printed circuit board 130 are available, to confirm whether the host computer 110 and the TAP controller 120 build a communication relationship, and ensure that the host computer 110 can acquire information such as the chip ID of each master controller chip 60 from the TAP controller 120, thereby confirming that the host computer 110 is ready for the loading environment.

When the host computer 110 verifies that the load file is valid and the JTAG links of each printed circuit board 130 are available (i.e., it is confirmed that the host computer 110 is ready for the loading environment), the host computer 110 can collect the information of firmware version of each chip to be loaded 70 through the controllable physical connections 72 and compare the firmware version of each chip to be loaded 70 with the firmware version to be loaded respectively. When the host computer 110 determines that the firmware version to be loaded is higher than the firmware version of at least one chip to be loaded 70, the host computer 110 sends a loading flag to the at least one chip to be loaded 70, so that the at least one chip to be loaded 70 enters the loading mode from the normal mode.

Next, the host computer 110 can redefine the controllable physical connections 72 between the chip to be loaded 70 entering the loading mode and the master controller chip 60 connected thereto, so that the controllable physical connections 72 are used as loading buses and have the same data flow direction to wait to receive the load file. The step of redefining the controllable physical connections 72 between the chip to be loaded 70 entering the loading mode and the master controller chip 60 connected thereto by the host computer 110 further comprises the following steps of: taking one of the controllable physical connections 72 between the chip to be loaded 70 entering the loading mode and the master controller chip 60 connected thereto as a parallel clock by the host computer 110; taking the controllable physical connections 72 whose quantity is an integer multiple of the byte in the controllable physical connections 72 between the chip to be loaded 70 entering the loading mode and the master controller chip 60 connected thereto for receiving data of the load file in parallel by the host computer 110; and taking the remaining controllable physical connections 72 in the controllable physical connections 72 between the chip to be loaded 70 entering the loading mode and the master controller chip 60 connected thereto for receiving a frame count in parallel by the host computer 110. When the host computer 110 takes M controllable physical connections 72 between the chip to be loaded 70 entering the loading mode and the master controller chip 60 connected thereto for receiving the frame count in parallel, the maximum value corresponding to the frame count is $2^M$. The host computer 110 is responsible for counting the quantity of the frames from zero and recounts after the number of counts reaches the maximum value (that is, the frame count is from 0 to $2^M-1$).

In this embodiment, the controllable physical connections 72 between each chip to be loaded 70 entering the loading mode and the master controller chip 60 connected thereto can comprise twenty L-Buses, four SPI buses, two $I^2C$ bus, and one GPIO pin (i.e., there are totally twenty-seven physical lines), and can be redefined by the host computer 110. The host computer 110 takes one of the controllable physical connections 72 between each chip to be loaded 70 entering the loading mode and the master controller chip 60 connected thereto as a parallel clock, takes twenty-four controllable physical connections 72 between each chip to be loaded 70 entering the loading mode and the master controller chip 60 connected thereto for receiving data of the load file in parallel, and takes two controllable physical connections 72 between each chip to be loaded 70 entering the loading mode and the master controller chip 60 connected thereto for receiving the frame count in parallel. However, this embodiment is not intended to limit the present invention, and may be adjusted according to actual needs.

The reason why the host computer 100 needs to redefine the controllable physical connections 72 between each chip to be loaded 70 entering the loading mode and the master controller chip 60 connected thereto is that when each chip to be loaded 70 enters the loading mode, it only performs the loading task, so that the original functions of the controllable physical connections 72 have been invalidated, and they can be redefined and utilized thus.

To obtain the wider transmission bandwidth and the higher data throughput, the controllable physical connections 72, which can be redefined, should be collected as many as possible. According to the boundary scan standard, the JTAG interface gets data and puts data independently by two instructions from the TAP controller 120. The switching between instructions is completed by a series of state machine cycles. In order to reduce the waste of transmission time caused by the switching between instructions, the data is received or sent in a unified direction (that is, all the controllable physical connections 72 are used as the buses for sending data or all the controllable physical connections 72 are used as the buses for receiving data), so that the transmission bandwidth for sending data or receiving data can reach the maximum bandwidth.

Figure 2:
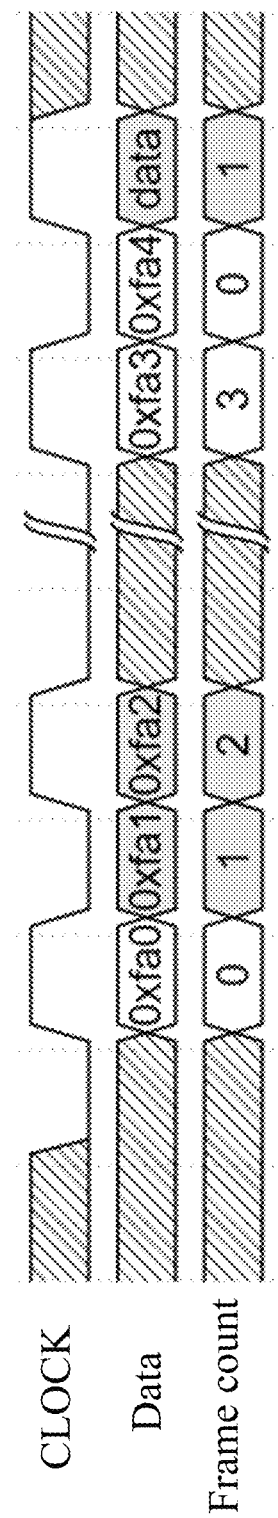
FIG. 2 is a timing diagram of an embodiment of a loading program executed by each chip to be loaded in a loading mode.

In this embodiment, the normalized (i.e., unified data flow direction) loading buses are configured to comprise one bus for the parallel clock, twenty-four buses (i.e., the quantity is an integer multiple of the byte) for receiving data in parallel, the remaining buses (i.e. two buses) for receiving the frame count in parallel. The parallel clock is defined as a double-edge trigger, so that the pre-stage JTAG link receives one frame of data for each push, and the bit rate is optimal. For example, please refer to FIG. 2, which is a timing diagram of an embodiment of a loading program executed by each chip to be loaded in a loading mode. After the host computer 110 is ready to send the load file and redefines the controllable physical connections 72, in the first clock cycle, the host computer 110 pushes the first 24-bit data (0xfa0) and the frame count 0, and the second 24-bit data (0xfa1) and the frame count 1 of the load file on the rising/falling edge of the clock respectively since the parallel clock is specified as a double edge trigger (i.e., the frame period is half a clock cycle). In this example, the host computer 110 takes two controllable physical connections 72 between each chip to be loaded 70 entering the loading mode and the master controller chip 60 connected thereto for receiving the frame count in parallel, so that the maximum value corresponding to the frame count is 4 (i.e., the maximum value corresponding to the frame count is $2^2$), and the host computer 110 is responsible for counting the quantity of the frames from zero and recounts after the number of counts reaches the maximum value (that is, the frame count is from 0 to 3).

When each chip to be loaded 70 entering the loading mode receives the frame period (i.e., each chip to be loaded 70 entering the loading mode perceives the clock), each chip to be loaded 70 entering the loading mode receives the data of the load file and the frame count and compares the received frame count with the count value of its internal counter. The received data of the load file is valid when the received frame count matches the count value of the internal counter of each chip to be loaded 70 entering the loading mode, and then the received data of the load file is put into the internal random access memory (RAM) of each chip to be loaded 70 entering the loading mode.

Therefore, the host computer 110 sends the load file and the IAP command to each chip to be loaded 70 entering the loading mode through the controllable physical connections 72, so that each chip to be loaded 70 entering the loading mode executes the loading program based on the frame period and the frame count to completely receive the load file and execute the IAP command to program the ROM it has.

When each chip to be loaded 70 entering the loading mode finishes executing the loading program, each chip to be loaded 70 entering the loading mode jumps out of the loading mode (i.e., each chip to be loaded 70 entering the loading mode returns to the normal mode), and the host computer 110 restores the definitions of the controllable physical connections 72 between each chip to be loaded 70 and the master controller chip 60 connected thereto. In this embodiment, the controllable physical connections 72 between each chip to be loaded 70 and the master controller chip 60 connected thereto can be restored to twenty L-Buses, four SPI buses, two $I^2C$ bus, and one GPIO pin.

It should be noted that in order to maintain the reliability of the transmitted data, each chip to be loaded 70 entering the loading mode needs to check the continuity of the frame count during the execution of the loading program, and stops receiving data when the error is determined, and then reports the status of the response period to request retransmission. In addition, in this embodiment, in order to save time for loading the firmware, the TAP controller 120 can use the bypass command to cause the pre-stage master controller chip 60 (i.e., it is the master controller chip 60 that is not connected to the chip to be loaded 70) to not participate in the program of loading the firmware. Moreover, the system for online cascaded loading firmware based on boundary scan 100 only performs firmware loading (i.e., firmware updating) on the chip to be loaded 70 entering the loading mode. When part of the chips to be loaded 70 does not need to execute the loading program (that is, the firmware version of the chips to be loaded 70 is higher than the firmware version to be loaded), TAP controller 120 can send a bypass command to the chips to be loaded 70, so that the chips to be loaded 70 that do not need to execute the loading program no longer receive the load data. no longer receives the load data.

Figure 3B:
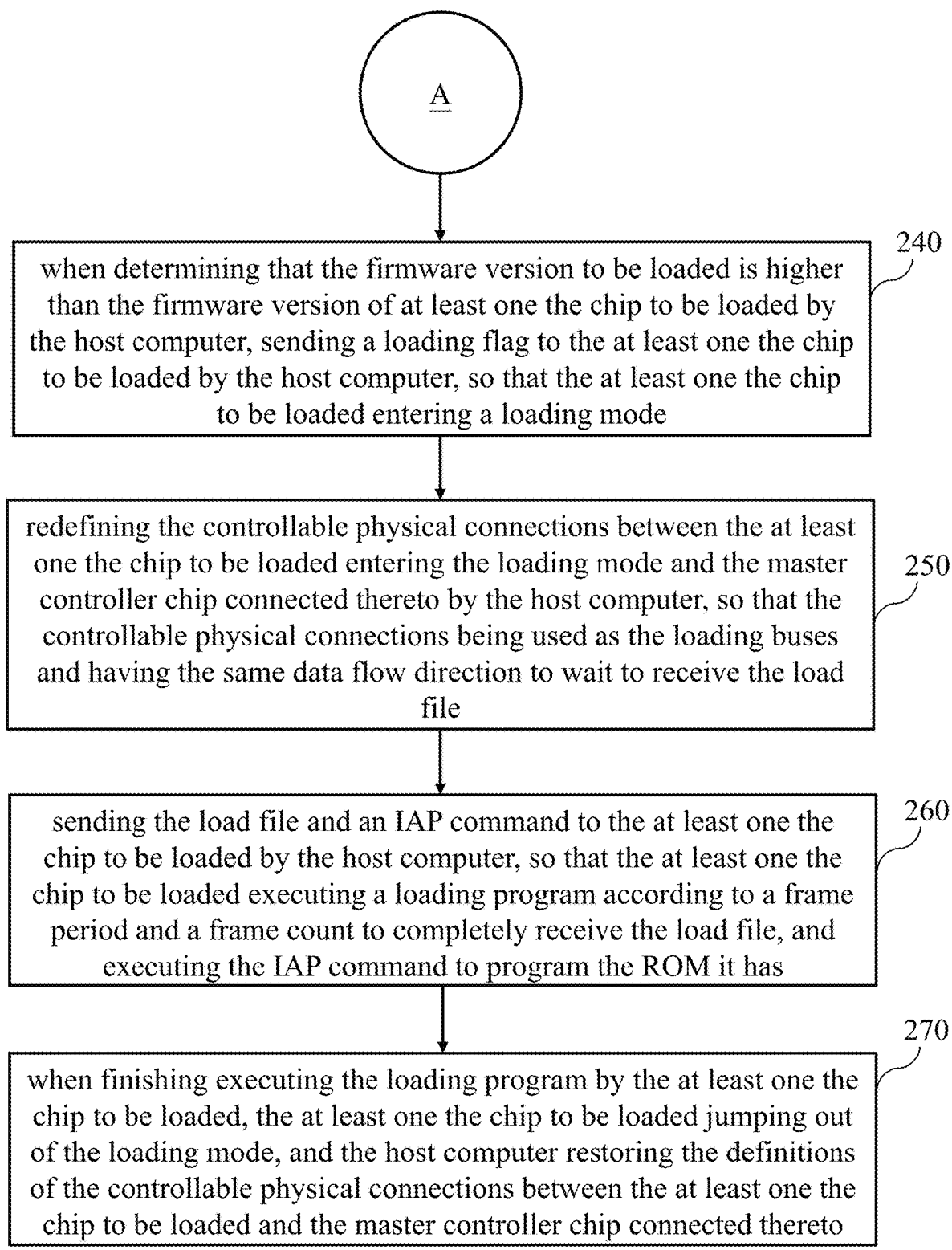

Next, please refer to FIG. 3A and FIG. 3B, and FIG. 3A and FIG. 3B are a flow chart of a method for online cascaded loading firmware based on boundary scan executed by the system for online cascaded loading firmware based on boundary scan of FIG. 1. In this embodiment, the method for online cascaded loading firmware based on boundary scan comprises the following steps of: providing a host computer, a TAP controller, and N printed circuit boards, wherein each printed circuit board is provided with one or more master controller chips cascaded through the JTAG interface and one or more chips to be loaded, each chip to be loaded is connected to one of the master controller chips through a plurality of controllable physical connections, the host computer is connected to the TAP controller, the printed circuit boards are serially connected to each other, the TAP controller is connected to the first printed circuit board and the Nth printed circuit board through the JTAG interfaces, and N is greater than or equal to two and is a positive integer (step 210); verifying whether a load file is valid and whether a JTAG link of each printed circuit board is available by the host computer (step 220); when verifying that the load file is valid and the JTAG link of each printed circuit board is available by the host computer, collecting the information of the firmware version of each chip to be loaded through the controllable physical connections by the host computer, and comparing the firmware version of each chip to be loaded with the firmware version to be loaded respectively by the host computer (step 230); when determining that the firmware version to be loaded is higher than the firmware version of at least one the chip to be loaded by the host computer, sending a loading flag to the at least one the chip to be loaded by the host computer, so that the at least one the chip to be loaded entering a loading mode (step 240); redefining the controllable physical connections between the at least one the chip to be loaded entering the loading mode and the master controller chip connected thereto by the host computer, so that the controllable physical connections being used as the loading buses and having the same data flow direction to wait to receive the load file (step 250); sending the load file and an IAP command to the at least one the chip to be loaded by the host computer, so that the at least one the chip to be loaded executing a loading program according to a frame period and a frame count to completely receive the load file, and executing the IAP command to program the ROM it has (step 260); and when finishing executing the loading program by the at least one the chip to be loaded, the at least one the chip to be loaded jumping out of the loading mode, and the host computer restoring the definitions of the controllable physical connections between the at least one the chip to be loaded and the master controller chip connected thereto (step 270).

The above various steps, if there is no causal relationship, do not limit the order of execution of the present invention.

Through the above steps, the present invention can fully utilize existing hardware resources, construct a flexible parallel loading bus, and improve data transmission without developing an independent loading bus. The chip is suitable for online cascaded loading firmware on the production line without the limitation of its own JTAG standard interface. The present invention does not require the development of related functions of the master controller chip on the printed circuit board, and saves the development cost and the process cost. Since the loading bus is not sensitive to the periodicity of data transmission, it is not affected by the operating system of the host computer or the delay of the TAP controller, and has better adaptability for application.

The step of redefining the controllable physical connections between the at least one the chip to be loaded entering the loading mode and the master controller chip connected thereto by the host computer further comprises the following steps of: taking one of the controllable physical connections between the at least one the chip to be loaded entering the loading mode and the master controller chip connected thereto as a parallel clock by the host computer; taking the controllable physical connections whose quantity is an integer multiple of the byte in the controllable physical connections between the at least one the chip to be loaded entering the loading mode and the master controller chip connected thereto for receiving data of the load file in parallel by the host computer; and taking the remaining controllable physical connections in the controllable physical connections between the at least one the chip to be loaded entering the loading mode and the master controller chip connected thereto for receiving a frame count in parallel by the host computer. The detailed description has been described in the above paragraphs and does not be described again.

In addition, when the host computer takes M controllable physical connections between the at least one the chip to be loaded and the master controller chip connected thereto for receiving the frame count in parallel, a maximum value corresponding to the frame count is $2^M$, and the host computer is responsible for counting the quantity of the frames from zero and recounts after the number of counts reaches the maximum value (that is, the frame count is from 0 to $2^M-1$). The detailed description has been described in the above paragraphs and does not be described again.

Moreover, when the at least one the chip to be loaded receives the frame period, receives the data of the load file and the frame count, and comparing the received frame count with the count value of the internal counter thereof. When the received frame count matches the count value of the internal counter of each chip to be loaded entering the loading mode, it is confirmed that the received data of the load file is valid, and then the received data of the load file is put into the RAM of each chip to be loaded entering the loading mode. The detailed description has been described in the above paragraphs and does not be described again.

Furthermore, the at least one the chip to be loaded also checks the continuity of the frame count during the execution of the loading program. When the error is determined, the at least one the chip to be loaded stops receiving data, and then reports the status of the response period to request retransmission. The detailed description has been described in the above paragraphs and does not be described again.

According to above-mentioned contents, the difference between the present invention and the conventional technology is that when the host computer determines that the firmware version to be loaded is higher than the firmware version of at least one chip to be loaded, the loading flag is sent to the at least one chip to be loaded to enable the at least one chip to be loaded to enter a loading mode; the host computer redefines a plurality of controllable physical connections between the at least one chip to be loaded entering the loading mode and the master controller chip connected thereto so that they act as loading buses; the host computer sends a load file and an IAP command to the at least one chip to be loaded through the loading buses, and the at least one chip to be loaded executes a loading program according to a frame period and a frame count to completely receive the load file and then executes the IAP command to program its read-only memory; when the at least one chip to be loaded finishes the loading process, the at least chip to be loaded jumps out of the loading mode, and the host computer restores the definitions of the controllable physical connections.

By the above-mentioned technique, the present invention can fully utilize existing hardware resources, construct a flexible parallel loading bus, and improve data transmission without developing an independent loading bus. The chip is suitable for online cascaded loading firmware on the production line without the limitation of its own JTAG standard interface. The present invention does not require the development of related functions of the master controller chip on the printed circuit board, and saves the development cost and the process cost. Since the loading bus is not sensitive to the periodicity of data transmission, it is not affected by the operating system of the host computer or the delay of the TAP controller, and has better adaptability for application.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A system for online cascaded loading firmware based on boundary scan, comprising:
   a Test Access Port (TAP) controller;
   N printed circuit boards, each printed circuit board being provided with one or more master controller chips cascaded through a Joint Test Action Group (JTAG) interface and one or more chips to be loaded, each chip to be loaded being connected to one of the master controller chips through a plurality of controllable physical connections, the printed circuit boards being serially connected to each other, the TAP controller being connected to the first printed circuit board and the Nth printed circuit board through the JTAG interfaces, and N being greater than or equal to two and being a positive integer; and
   a host computer, connected to the TAP controller, configured to verify whether a load file is valid and whether a JTAG link of each printed circuit board is available, wherein, when the host computer verifies that the load file is valid and the JTAG link of each printed circuit board is available, the host computer collects the information of a firmware version of each chip to be loaded through the controllable physical connections, and compares the firmware version of each chip to be loaded with a firmware version to be loaded, when the host computer determines that the firmware version to be loaded is higher than the firmware version of at least one the chip to be loaded, the host computer sends a loading flag to the at least one the chip to be loaded, so that the at least one the chip to be loaded enters a loading mode, the host computer redefines the controllable physical connections between the at least one the chip to be loaded entering the loading mode and the master controller chip connected thereto, so that the controllable physical connections are used as the loading buses and have the same data flow direction to wait to receive the load file, the host computer sends the load file and an In Application Programming (IAP) command to the at least one the chip to be loaded, so that the at least one the chip to be loaded executes a loading program according to a frame period and a frame count to completely receive the load file, and executes the IAP command to program the Read-Only Memory (ROM) it has, when the host computer finishes executing the loading program by the at least one the chip to be loaded, the at least one the chip to be loaded jumps out of the loading mode, and the host computer restores the definitions of the controllable physical connections between the at least one the chip to be loaded and the master controller chip connected thereto.

2. The system according to claim 1, the step of the host computer redefines the controllable physical connections between the at least one the chip to be loaded entering the loading mode and the master controller chip connected thereto further comprises the following steps of:
   the host computer takes one of the controllable physical connections between the at least one the chip to be loaded entering the loading mode and the master controller chip connected thereto as a parallel clock;
   the host computer takes the controllable physical connections whose quantity is an integer multiple of the byte in the controllable physical connections between the at least one the chip to be loaded entering the loading mode and the master controller chip connected thereto for receiving data of the load file in parallel; and
   the host computer takes the remaining controllable physical connections in the controllable physical connections between the at least one the chip to be loaded entering the loading mode and the master controller chip connected thereto for receiving a frame count in parallel.

3. The system according to claim 2, wherein when the host computer takes M controllable physical connections between the at least one the chip to be loaded entering the loading mode and the master controller chip connected thereto for receiving the frame count in parallel, a maximum value corresponding to the frame count is 2M, and the host computer is responsible for counting the quantity of the frames from zero and recounts after the number of counts reaches the maximum value.

4. The system according to claim 2, wherein when the at least one the chip to be loaded entering the loading mode receives the frame period, the at least one the chip to be loaded entering the loading mode receives the data of the load file and the frame count and compares the received frame count with the count value of its internal counter, and the received data of the load file is valid when the received frame count matches the count value of the internal counter of the at least one the chip to be loaded entering the loading mode, and then the received data of the load file is put into the internal Random Access Memory (RAM) of the at least one the chip to be loaded entering the loading mode.

5. The system according to claim 1, wherein the at least one the chip to be loaded entering the loading mode needs to check the continuity of the frame count during the execution of the loading program, and stops receiving data when the error is determined, and then reports a status of a response period to request retransmission.

6. A method for online cascaded loading firmware based on boundary scan, comprising the following steps of:
   providing a host computer, a Test Access Port (TAP) controller, and N printed circuit boards, wherein each printed circuit board is provided with one or more master controller chips cascaded through the Joint Test Action Group (JTAG) interface and one or more chips to be loaded, each chip to be loaded is connected to one of the master controller chips through a plurality of controllable physical connections, the host computer is connected to the TAP controller, the printed circuit boards are serially connected to each other, the TAP controller is connected to the first printed circuit board and the Nth printed circuit board through the JTAG interfaces, and N is greater than or equal to two and is a positive integer;
   verifying whether a load file is valid and whether a JTAG link of each printed circuit board is available by the host computer;
   when verifying that the load file is valid and the JTAG link of each printed circuit board is available by the host computer, collecting information of a firmware version of each chip to be loaded through the controllable physical connections by the host computer, and comparing the firmware version of each chip to be loaded with a firmware version to be loaded respectively by the host computer;
   when determining that the firmware version to be loaded is higher than the firmware version of at least one the chip to be loaded by the host computer, sending a loading flag to the at least one the chip to be loaded by the host computer, so that the at least one the chip to be loaded entering a loading mode;

redefining the controllable physical connections between the at least one the chip to be loaded entering the loading mode and the master controller chip connected thereto by the host computer, so that the controllable physical connections being used as the loading buses and having the same data flow direction to wait to receive the load file;

sending the load file and an In Application Programming (TAP) command to the at least one the chip to be loaded by the host computer, so that the at least one the chip to be loaded executing a loading program according to a frame period and a frame count to completely receive the load file, and executing the TAP command to program the Read-Only Memory (ROM) it has; and when finishing executing the loading program by the at least one the chip to be loaded, the at least one the chip to be loaded jumping out of the loading mode, and the host computer restoring the definitions of the controllable physical connections between the at least one the chip to be loaded and the master controller chip connected thereto.

7. The method according to claim 6, wherein the step of redefining the controllable physical connections between the at least one the chip to be loaded entering the loading mode and the master controller chip connected thereto by the host computer further comprises the following steps of:

taking one of the controllable physical connections between the at least one the chip to be loaded entering the loading mode and the master controller chip connected thereto as a parallel clock by the host computer;

taking the controllable physical connections whose quantity is an integer multiple of the byte in the controllable physical connections between the at least one the chip to be loaded entering the loading mode and the master controller chip connected thereto for receiving data of the load file in parallel by the host computer; and taking the remaining controllable physical connections in the controllable physical connections between the at least one the chip to be loaded entering the loading mode and the master controller chip connected thereto for receiving a frame count in parallel by the host computer.

8. The method according to claim 7, wherein when the host computer takes M controllable physical connections between the at least one the chip to be loaded and the master controller chip connected thereto for receiving the frame count in parallel, a maximum value corresponding to the frame count is 2M, and the host computer is responsible for counting the quantity of the frames from zero and recounts after the number of counts reaches the maximum value.

9. The method according to claim 7, wherein when the at least one the chip to be loaded receives the frame period, receives the data of the load file and the frame count, and comparing the received frame count with the count value of the internal counter thereof, when the received frame count matches the count value of the internal counter of the at least one the chip to be loaded entering the loading mode, it is confirmed that the received data of the load file is valid, and then the received data of the load file is put into the Random Access Memory (RAM) of the at least one the chip to be loaded entering the loading mode.

10. The method according to claim 6, wherein the at least one the chip to be loaded also checks the continuity of the frame count during the execution of the loading program, When the error is determined, the at least one the chip to be loaded stops receiving data, and then reports a status of a response period to request retransmission.

* * * * *